UNITED STATES PATENT OFFICE.

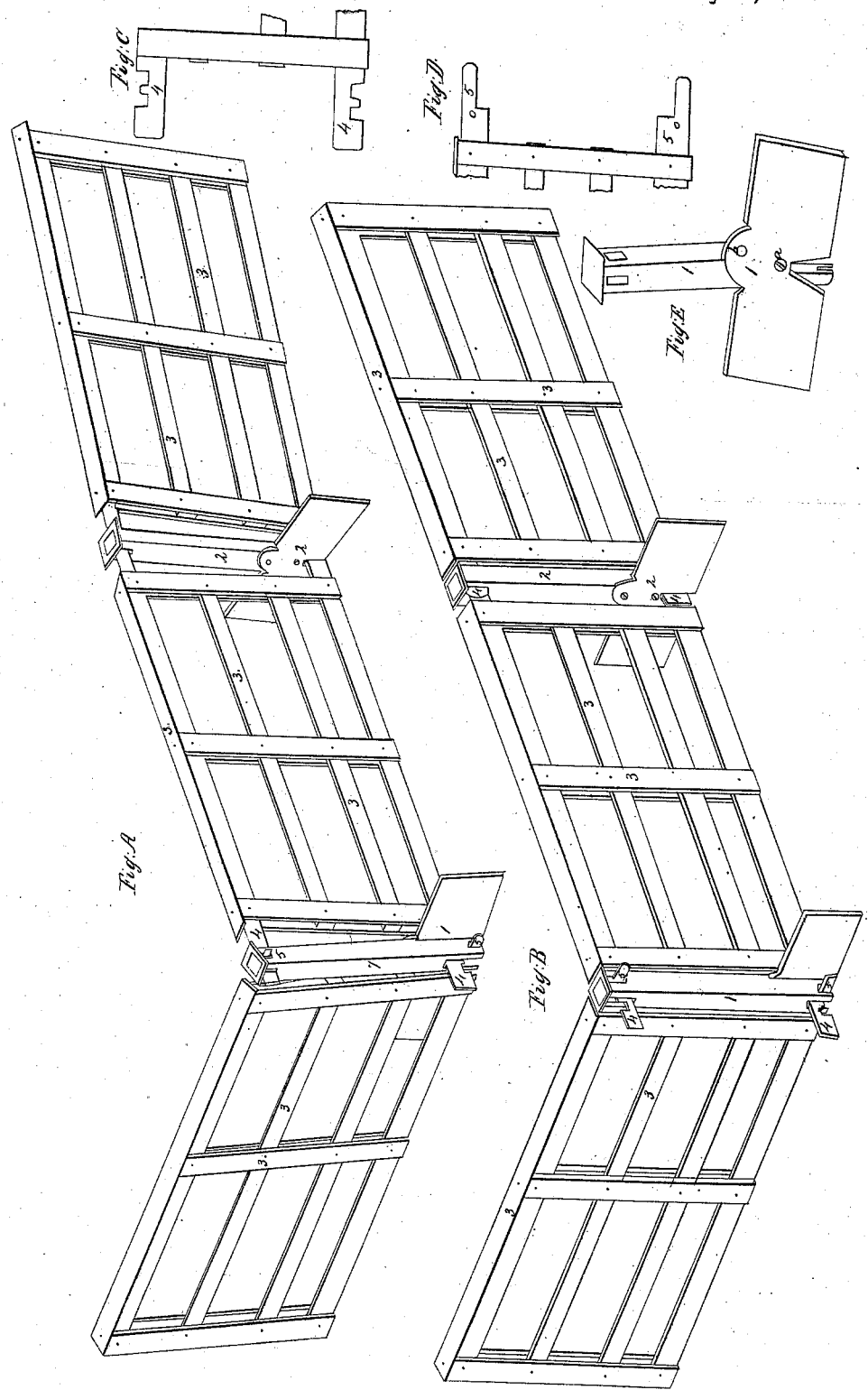

EPHRAIM D. FOSS, OF MAINVILLE, OHIO.

FARM-FENCE FOR ROLLING GROUND.

Specification of Letters Patent No. 15,561, dated August 19, 1856.

*To all whom it may concern:*

Be it known that I, EPHRAIM D. Foss, of Mainville, in the county of Warren and State of Ohio, have made certain new and useful Improvements in Shifting Vertical Portable Fences; and I do hereby declare that the following is a full and exact description thereof, reference being had to the accompanying drawings, forming part of this specification, and to the letters and figures of reference marked thereon.

Similar figures refer to corresponding parts.

The labor and expense bestowed upon ordinary farm fences, is, in the aggregate, immense; and is a serious tax to the farmer and others who require them.

The object of my improvement is to produce a cheap, durable and convenient fence, and one that is adaptable to the most uneven ground, hill sides, or to abrupt changes on the surface of the ground, and at the same time is a portable construction.

To enable others skilled in the art to make and use my improvement, I will proceed to describe its construction and operation by referring to the accompanying drawings.

Figure A, is a perspective side and end elevation of the vertical-shifting fence. This view represents the fence passing over abrupt hollows, uneven and sloping ground, and shows the contrivances for always maintaining the fence in a vertical position notwithstanding said inequalities. Fig. B, represents the fence used upon perfectly level ground, and is also sketched in perspective. Figs. C, and D, are side views of the tenons which fit into suitable mortises in the corner post. Fig. E, represents the shiftable base-post showing the upper stay-pin (or screws) removed, leaving said post free and adjustable as desired.

1, and 2, are the vertical-shifting base posts.

3, 3, 3, represent the fence.

4, 4, and 5, and 5 are the tenons fitting into the corner-post mortises made to receive them.

The separate view of the vertical-shifting base-post 1, in Fig. E, sufficiently describes by illustration, the manner of constructing the same and also its use.

The pin or bolt holes seen in the different tenons are used for inclining and adjusting the parts of the fence into any desired position after which they are secured in such positions by pins passing through both post and tenons.

My improvement will apply to fences for farm use, or to those intended for ornament, and its advantages are so obvious as to be almost needless to mention. However. it secures cheapness, durability, convenience, and is movable at pleasure.

I distinctly disclaim all and each of the several devices used in the construction of portable fences which have been in common use or have been patented; but What I do claim and wish to secure by Letters Patent is—

The vertical-shifting base-post in combination with the arrangement and use of the tenons, all substantially as set forth in this specification.

EPHRAIM D. FOSS.

Witnesses:
L. W. SMITH,
JOHN M. FOSS.